United States Patent [19]

Stevens

[11] Patent Number: 4,828,659
[45] Date of Patent: May 9, 1989

[54] CONTROLLED HYDRATION OF LOW VOLTAGE ALUMINUM ELECTROLYTIC CAPACITOR FOIL

[75] Inventor: James L. Stevens, Irmo, S.C.

[73] Assignee: North American Philips Corporation, New York, N.Y.

[21] Appl. No.: 88,514

[22] Filed: Aug. 20, 1987

Related U.S. Application Data

[63] Continuation of Ser. No. 582,191, Feb. 21, 1984, abandoned.

[51] Int. Cl.$^4$ ............................................. C25D 11/04
[52] U.S. Cl. ........................................ 204/29; 204/28; 204/33; 204/38.3
[58] Field of Search .................... 204/28, 29, 33, 38.3, 204/58

[56] References Cited

U.S. PATENT DOCUMENTS

| | | | |
|---|---|---|---|
| 2,853,445 | 9/1958 | Catotti et al. | 204/141 |
| 2,859,148 | 11/1958 | Altenpohl | 148/6.27 |
| 3,945,899 | 3/1976 | Nikaido et al. | 204/181 |
| 4,252,575 | 2/1981 | Bernard | 148/627 |
| 4,426,260 | 1/1984 | Stevens | 204/33 |

Primary Examiner—John F. Niebling
Assistant Examiner—William T. Leader
Attorney, Agent, or Firm—Norman N. Spain

[57] ABSTRACT

An improved low voltage aluminum electrolytic capacitor foil produced by a method of controlled hydration in warm water without the use of passivators having increased capacitance for a given size and using less energy in its formation.

3 Claims, 8 Drawing Sheets

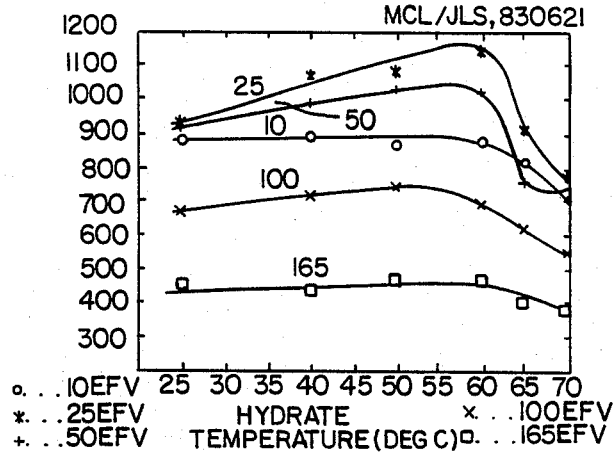
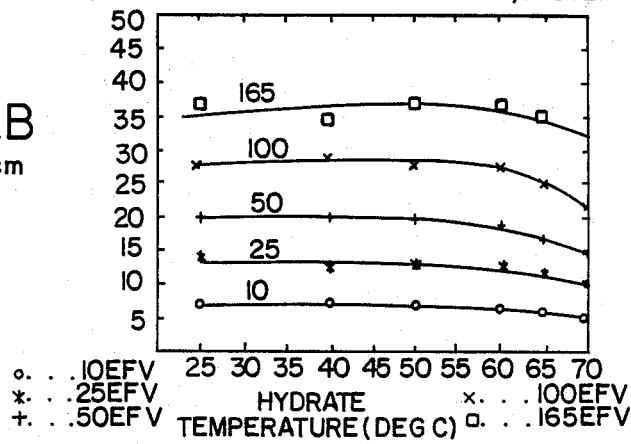
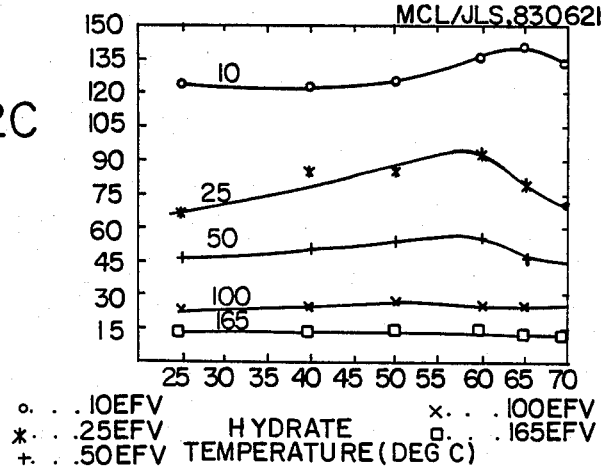

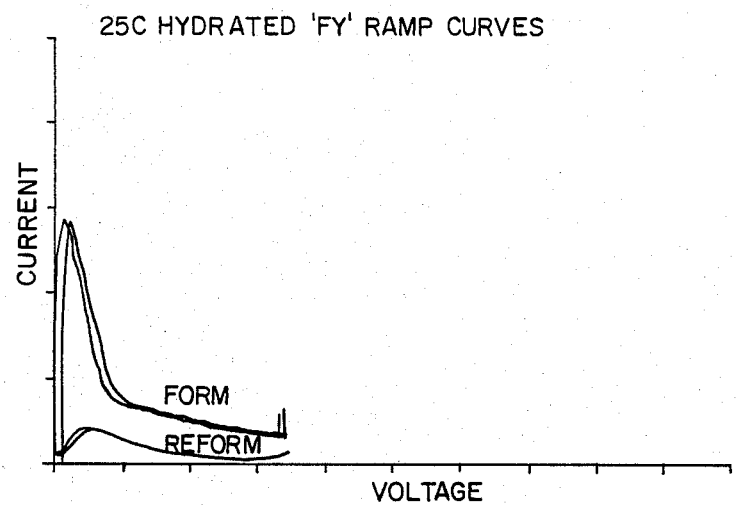
FIG.6A — 25C HYDRATED 'FY' RAMP CURVES
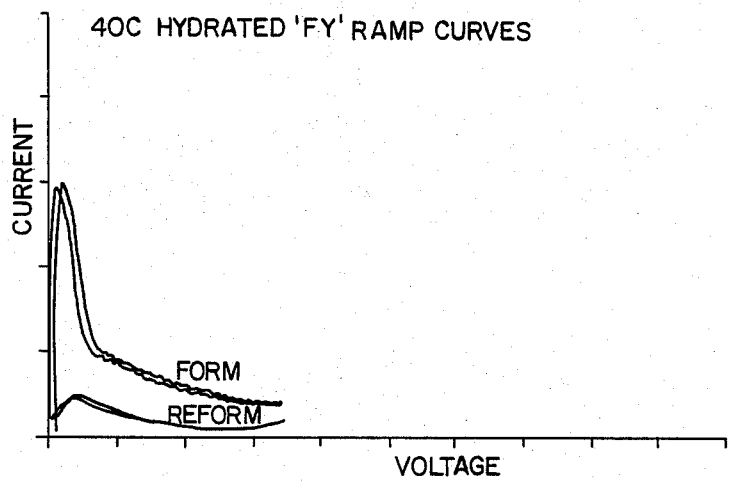
FIG.6B — 40C HYDRATED 'FY' RAMP CURVES
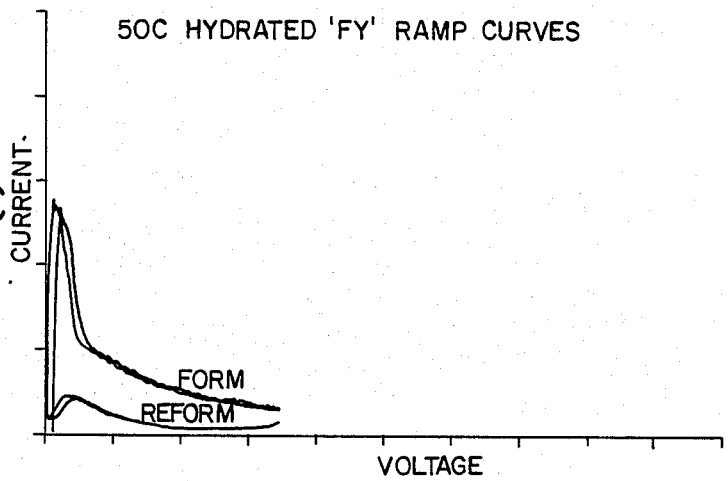
FIG.6C — 50C HYDRATED 'FY' RAMP CURVES

CONTROLLED HYDRATION OF LOW VOLTAGE ALUMINUM ELECTROLYTIC CAPACITOR FOIL

This is a continuation of application Ser. No. 582,191, filed Feb. 21, 1984, now abandoned.

BACKGROUND OF THE INVENTION

1. Field of the Invention

This invention pertains to the formation of low voltage aluminum electrolytic capacitor foil and in particular to the hydration of said foil before drying to increase the capacitance of the foil and the efficiency of formation of the foil without losing capacitance due to uncontrolled reaction.

2. Description of the Prior Art

Since the introduction of aluminum electrolytic capacitors around the turn of the century, there has been a continuing struggle to increase the capacitance per unit volume of the devices. Given the standard formulae for the capacitance of a parallel plate capacitor, increased capacitance is obtained either by increasing the true to apparent area ratio through etching or to increase the ratio of dielectric constant to dielectric strength through formation. The present invention is concerned with formation.

The first commercial capacitors used boric acid formation solutions to produce the aluminum oxide dielectric. Because of the stability problems and the solution costs, phosphate solutions displaced boric acid for low voltage use. In time, it was discovered that pretreatment such as hydration, heat treatment and annealing would produce improved formation efficiency and hence speed of formation and higher capacitance. These foils were inherently unstable. Hence, the hot water, heat treatment, and various other depolarization procedures were developed to permit the use of these gain improving, energy reducing processes.

The difficulty remained with low voltage foil because of its very fine etched tunnels, approximately a few tenths of a micron in diameter. Hydration is produced by a violet reaction with hot water which is difficult to control externally to the thicknesses required. Another approach involving high temperature heat treatment, produced high gain and high efficiency formation. However, the nature of this oxide was such as to be very difficult to produce stable, low-leakage-current formed foil. Experience showed that the proper annealing of the foil after etching had some beneficial effects on capacitance without the associated difficulties of heat treated foil. Currently, development work has focused on the use of dicarboxylic acids as formation ionogens. It has been found that these electrolytes produce capacitance equivalent to or greater than heat treatment at voltages above 25 EFV. This process produced high stability, high gain foil.

The present application is based on an understanding of the mechanism of gain enhancement offered by dicarboxylic acid formation. U.S. Pat. No. 4,252,575 teaches that attempts have been made to hydrate low voltage foil by use of passivators to control hydration. It is current in the art to use 95° to 100° C. deionized water with passivators to slow the reaction. This method is very difficult to control and has disadvantageous passivators which limit the capacitance increase possible in certain formation solutions.

Deductive reasoning shows that all known high gain formation processes involve treatments between etch and formation which deposit and/or modify the surface layer, a thermal oxide or hydrate. The dicarboxylic acid process mechanism is not known but could conceivably be aided by the presence of such a layer. Thermal layers are difficult from a control and stability point of view. The difficulty with hydration is that long induction times render control difficult. The induction time appears to be related to the fact that hydration cannot begin until the existing thermal oxide left by annealing and/or drying has been dissolved or penetrated. With this understanding, the control measure suggested by the present invention is to eliminate the induction time by depositing the hydrous surface layer before drying and annealing. This can be accomplished after final rinse in the etch procedure by exposing the foil to heated deionized water at a temperature low enough to control the reaction rate.

SUMMARY OF THE INVENTION

The hydration of aluminum capacitor foil has long been used to increase capacitance and aluminum oxide formation efficiency in foils over 100 volts. Difficulty with low voltage foils has been in the control of the process so as to eliminate the amount of hydrate formed to prevent excess aluminum consumption and capacitance loss. Conventionally, hydrations done in 95° to 100° C. deionized water produce psuedo boehmite. The process is characterized by a finite, variable induction time followed by a violent reaction. Other attempts to control the process have centered on the use of passivators like boric acid, borax, phosphate, etc., in hot water to slow the reaction. The difficulty is that the passivators are themselves difficult to control and they leave a residue on the surface which limits the effectiveness of certain formation solutions like adipate and others.

The novelty in the present invention is in the elimination of the induction time by hydrating immediately after etching and cleaning, but before drying, and to limit the reaction by using low water temperatures, in the range of 30° to 80° C. This reaction produces a hydrate, and gives up to 24% capacitance increase and 43% efficiency increase. The use of this method is detectable by a ramp formation curve and scanning electron micrographs of the foil surface.

The procedure of this invention may occur any time after etching but preferably immediately after cleaning to eliminate the variable induction time. The water should be deionized, greater than 1 megohm-cm$^2$ at 25° C. for cleanliness, but need not be to produce the hydrate. Temperatures below 30° C. are too low to produce realistic reaction times. Temperatures above 80° C. cause too fast and violent a reaction for reliable control. The key to the improvement relies on the realization that greater amounts of high capacitance crystalline oxide are produced when a proper surface layer is present on the etched foil. The process of the present invention for low voltage foil involves producing this surface layer by immersion in heated deionized water at the end of the etching procedure while the aluminum surface is still fresh. Ramp formation data shows that the warm water treatment promotes earlier formation of high gain crystalline oxide while reducing the coulombs required to accomplish formation. The use of the warm water process also produces a simultaneous speed increase and capacitance increase for certain effective formation voltages.

BRIEF DESCRIPTION OF THE DRAWINGS

FIGS. 2a, b and c are graphs showing the effects of temperature on factory etched foils for 1.8 minutes immersion.

FIG. 6a through 6f are graphs of the ramp formation and reform curves (concentrated solution) showing the effect of increasing hydration.

DESCRIPTION OF THE PREFERRED EMBODIMENTS

The first series of experiments used laboratory etched foil which had various warm water (50° C. treatment times. All samples were laboratory formed in a dicarboxylic salt solution to 52 volts only. This data can be seen in FIGS. 1a, b and c. As an additional note, this foil was blotted dry before air drying at 150° C.

Figure 1A:
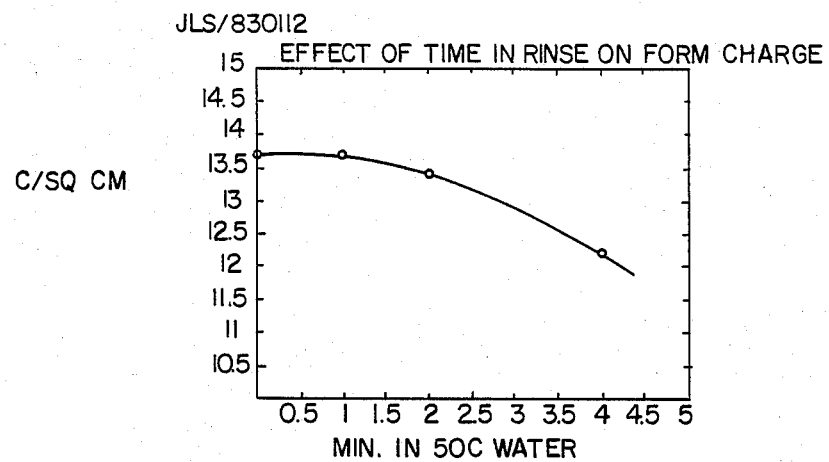
FIGS. 1a, b and c are graphs showing the effect of time in warm water on laboratory etched foils.
Figure 1B:
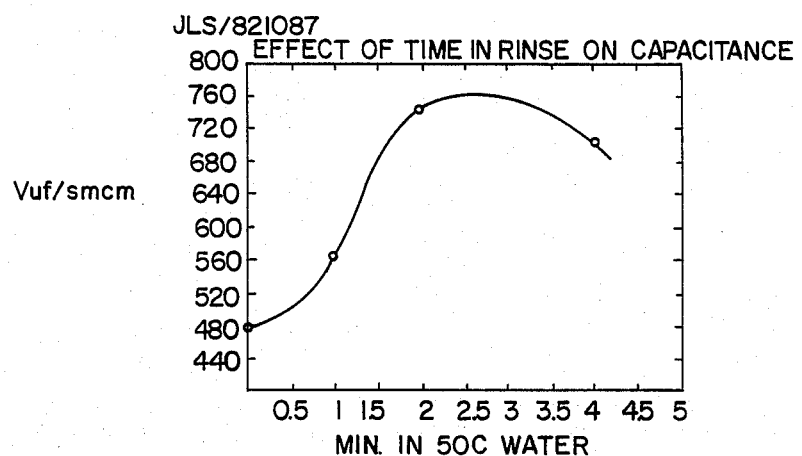
Figure 1C:
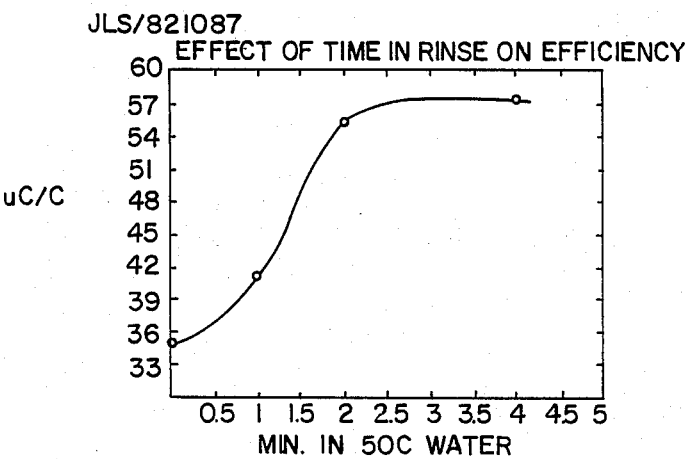

FIG. 1a shows the coulombs required for formation. Here the reduction in charge reflects the increased incorporation of pre-existing surface oxides (or hydroxides) into the barrier layer. Up to 11% of the original charge was saved for 4 minutes treatment. The uc/cm$^2$ (EFV - microfarad product/unit area) in FIG. 1b shows a steep rise up to 2 minutes followed by a leveling or slight drop up to 4 minutes. Finally, FIG. 1c gives the relative coulombic formation efficiency which increases up to 58% from no treatment to 4 minutes.

The results of these tests show that capacitance and formation efficiency can both be affected beneficially by proper warm water treatment after etching but before drying.

The next step was to determine the proper operating temperature for an etch machine since the time is determined by the maximum path length and machine speed. The results of this experiment are shown in FIGS. 2a, b and c. Each graph has five curves (one each for 10, 25, 50, 100, and 165 EFV). The legend shows the symbols for each.

FIG. 2a shows the behavior of the uc/cm$^2$ as measured in aqueous electrolyte. The 10 EFV curve shows little effect up to 50° C. where capacitance loss begins. The 25 EFV curve shows approximately 24% increase followed by smaller increases for 50, 100, and 165 EFV respectively. FIG. 2b shows the formation coulombs as being flat or reduced by as much as 20%. Both of the above are reflected in the Coulombic Efficiency in FIG. 2c. This figure increased by as much as 56%. The implication here is that for 1.8 minutes treatment at 60° C. all foils in the range of 25 to 100 EFV can attain increased capacitance and increased machine speed (coulombs) simultaneously. This represents a "double-barrelled" effect of dramatically increasing the production of foil (uc/hour) by up to 56% of this data transfers to machine etched foil.

The next step in the series was to etch a roll of low gain, low voltage foil such that the last pass of the rinse tank was held at 60°±2° C. (this gave approximately 1.5 minutes in the warm water). The other passes were held at 30° C.

Figure 3A:
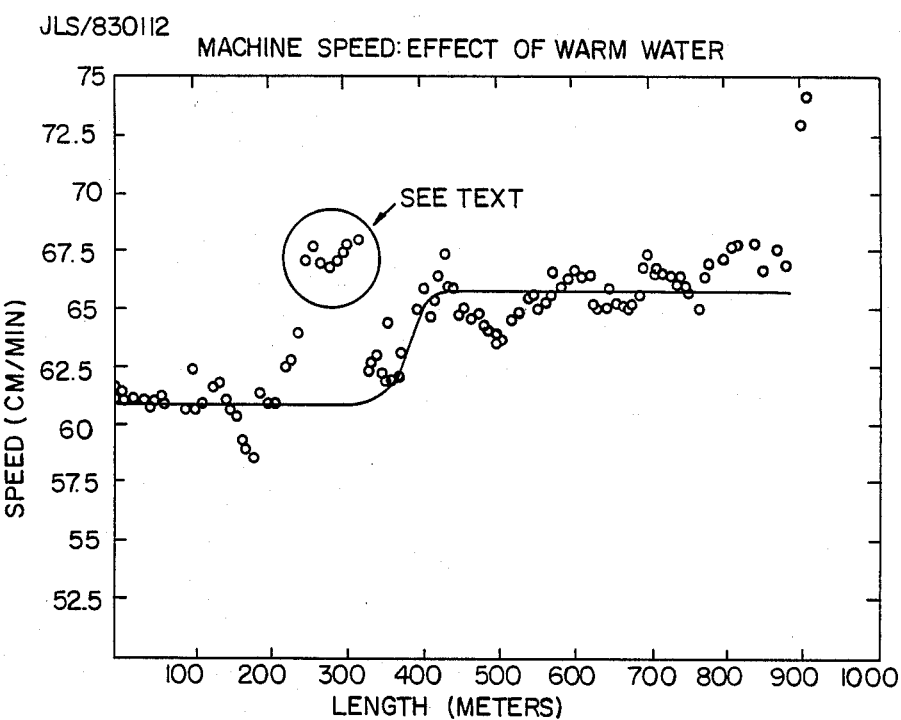
FIGS. 3a and b are graphs combining the effects of warm water on machine speed and V-uf product at 52 volts.
Figure 3B:
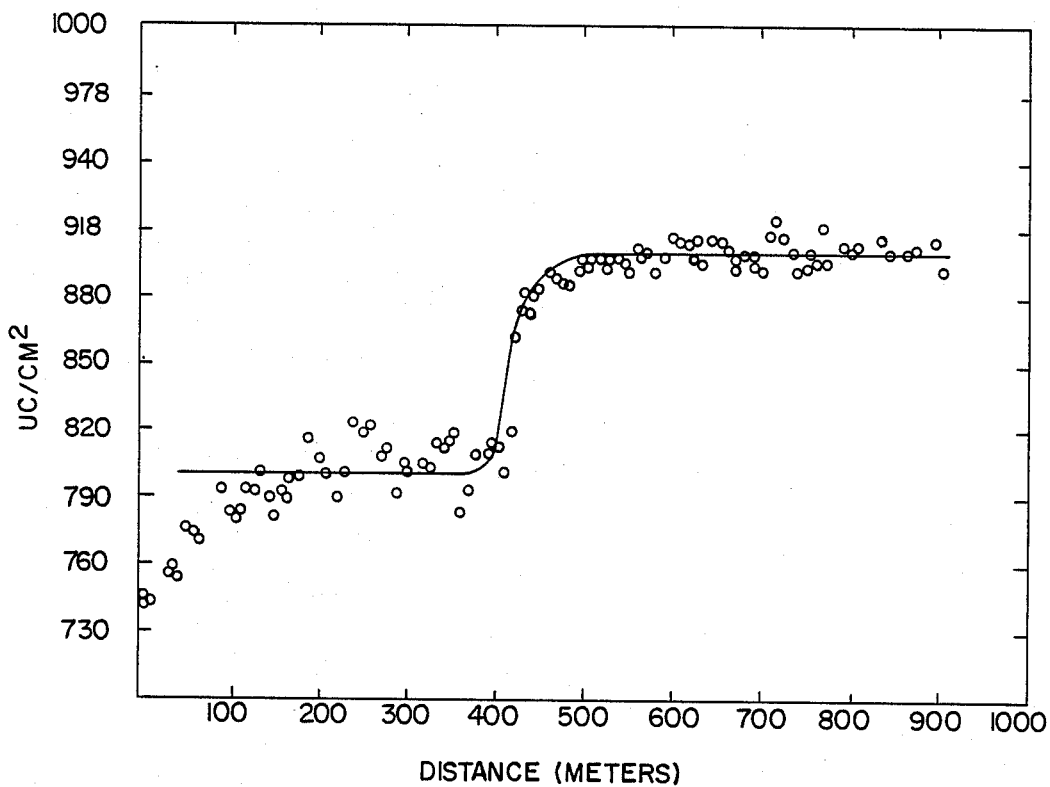

FIG. 3a shows the effect on formation machine speed when the junction between cold and warm water treated foils passes through at 52 volts. There is a 8.1% speed increase at 400 meters. The circled data occurred during a foil breakage when the machine was restarted. The formed foil profile of FIG. 3b also shows a jump of 10.7% in uc/cm$^2$ at 425 meters. These transitions do not exactly align due to slight miscalibrations in the separate tachometers.

Figure 4:
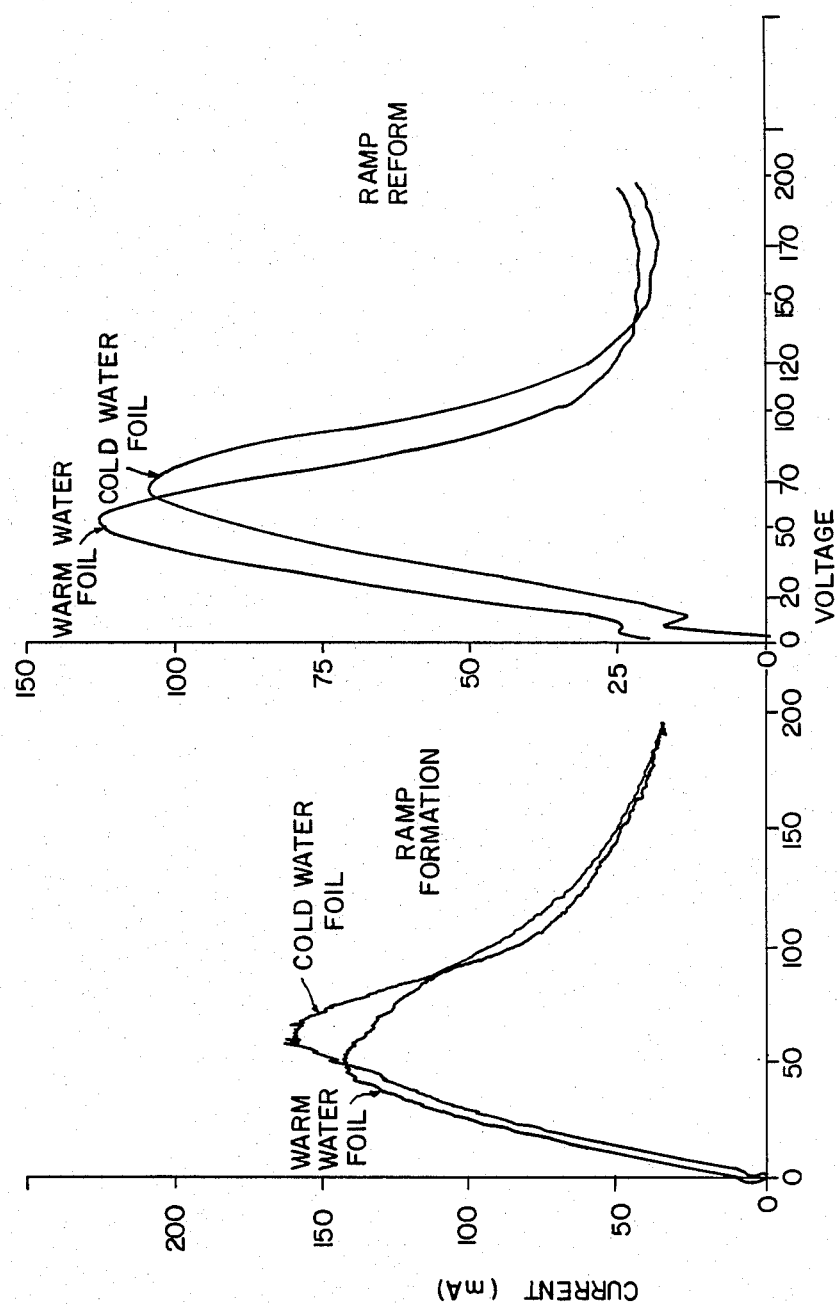
FIG. 4 is a graph showing ramp formation and reform curves comparing cold and warm water rinsed foils.
Figure 5A:
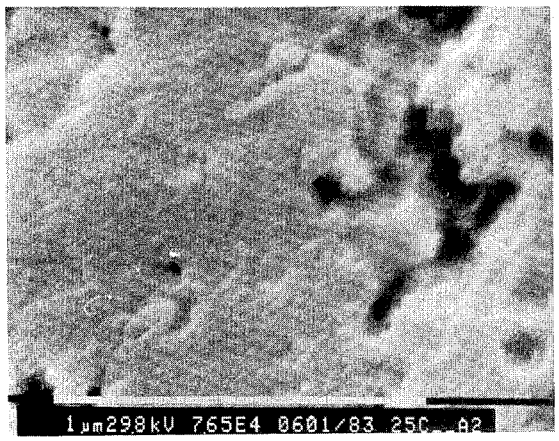
FIGS. 5a-f show the surface morphology of etched foils for 1.8 minute water rinse at various temperatures.
Figure 5B:
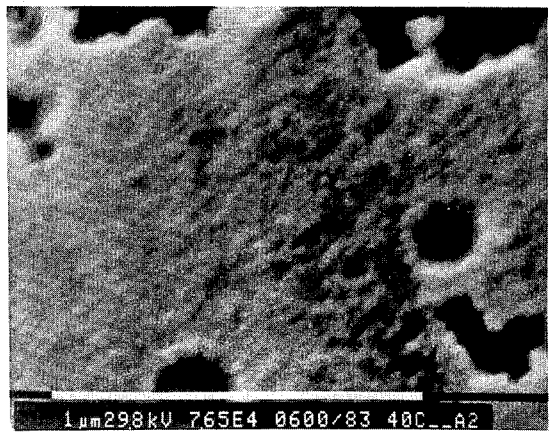
Figure 5C:
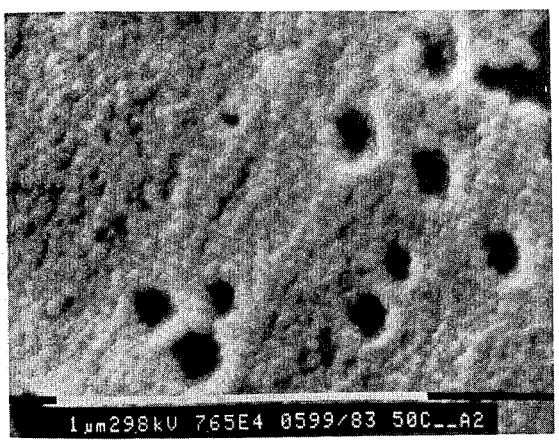
Figure 5D:
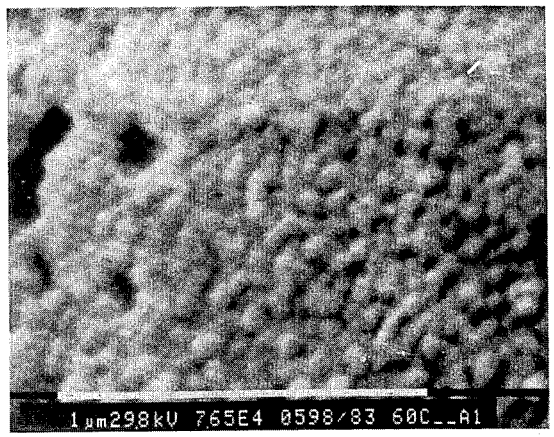
Figure 5E:
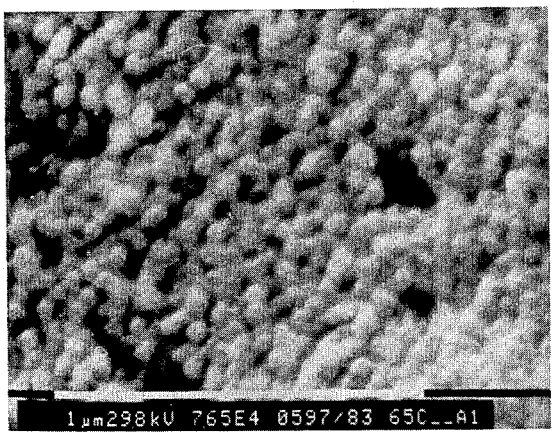
Figure 5F:
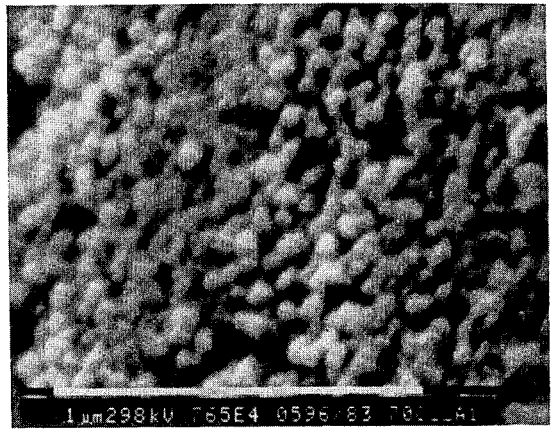
Figure 6D:
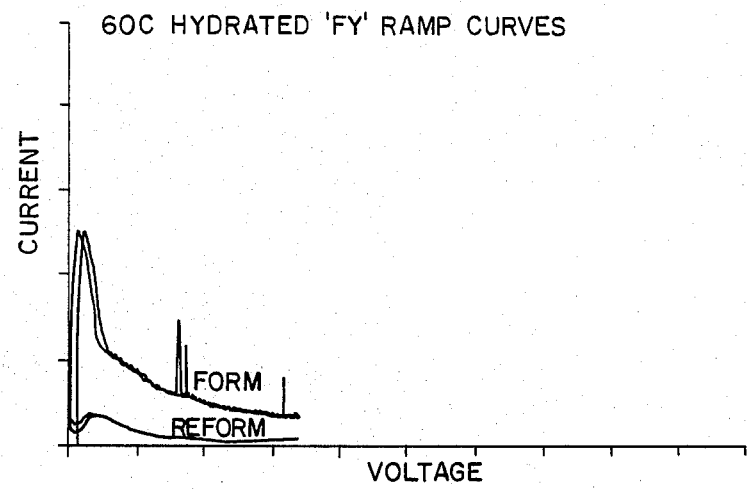
Figure 6E:
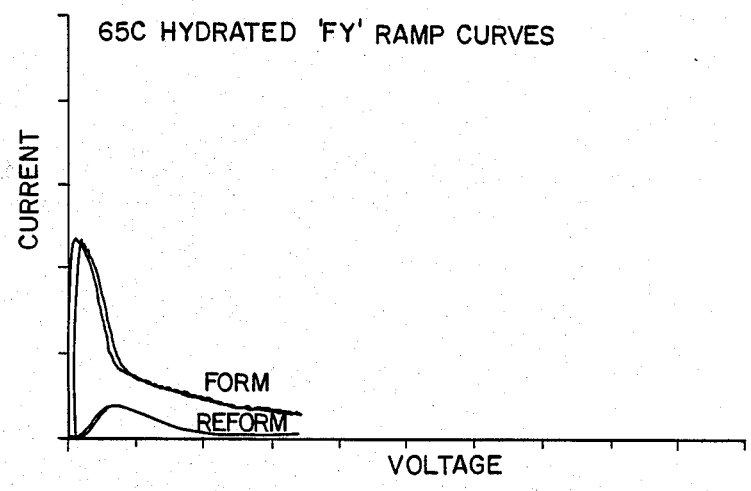
Figure 6F:
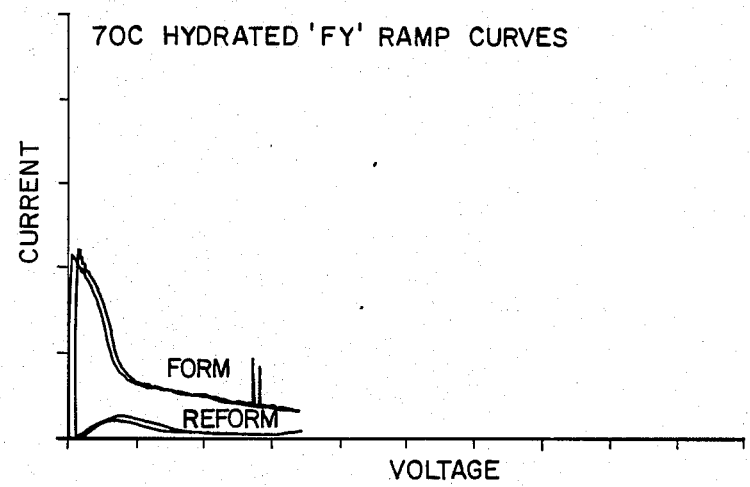

In order to gain insight into the mechanism of the warm water effect, samples of the two types of factory etched foil was ramp formed, tested, depolarized, and ramp reformed in FIG. 4. The curves on the left are the formation curves showing the "cold water" foil peaking at a higher current approximately 10 volts later than the "warm water" foil. The curves on the right are ramp reform and show the "warm water" foil peaking at 7% higher current at 24% of the EFV. The "cold water" ramp reform has its peak at 30% of the EFV.

The lower current for "warm water" ramp form despite its 7% higher uc/cm$^2$ reflects the improved formation efficiency. The fact that the curves cross at 90 volts implies that the "advantage" of the warm water foil is used up and that similar mechanisms apply above this voltage. The "warm water" ramp reform curve maximum is higher than that of the "cold water" foil by the same percentage as its gain advantage. This implies similar depolarization mechanisms. The significant factor here is the fact that the peak of the "warm water" foil ramp reform curve comes earlier. In the conventional view of ramp data, this fact implies that the crystalline/amorphous boundary in the oxide is closer to the metal surface than with "cold water" foil. Thus, if a surface layer is left by the "warm water" treatment, then it appears to promote earlier initiation of crystalline oxide than the layer left simply by drying and annealing the foil.

The next evidence is the series of SEM photos in FIGS. 5a through f. They show the evaluation of what appears to be hydrous aluminum clumps. At 25 to 50° C. these features are approximately 250 A in diameter. At 60° C., they measure nearly 400 A and go up to 550 A at 65 and 70° C.

In order to elucidate the mechanism of hydrated low voltage formation, samples were ramp formed to 165V in concentrated dicarboxylic salt solution at 90° C. The concentrated solution minimized the IR drop across the solution so that the shape of the curve is more nearly representative of the surface area/efficiency of the sample. These ramps are shown in FIGS. 6a through f. A close comparison of these curves for formation "peak" (Vo) and "plateau" (V1) voltages is made in Table 1.

TABLE 1

RAMP DATA FOR VARIOUS 'FY' HYDRATE TEMPERATURES

| Hydrate Temperature °C. | Form Plateau $V_1$ | Reform Maximum $V_2$ | Notes |
|---|---|---|---|
| 25 | 40.5 | 25.0 | |
| 40 | 27.5 | 18.5 | |
| 50 | 23.5 | 18.3 | |
| 60 | 21.5 | 17.5 | |
| 65 | 31.0 | 33.5 | Ramp Maximum has double |
| 70 | 34.5 | 33.5 | peak or is flattened |

There is no trend in the peak voltage. However, the plateau voltage decreases with increasing hydration temperature up to 65° C. where an abrupt increase occurs. The reform ramp "hump" (V2) also shows this trend. Since the "hump" voltage is considered to be related to the position of the crystalline/amorphous oxide interface, this data implies that increasing hydration lowers the crystal initiation voltage.

What is claimed:

1. An improved method of producing low voltage aluminum electrolytic capacitor foil having high gain and high energy efficiency, including the steps of etching said foil and cleaning said foil in a cold deionized water bath, wherein the improvement comprises the steps of:

immersing said foil immediately after said cleaning in a second deionized water bath having a temperature of from 40° C. to 65° C. for a period of from 15 minutes to 30 seconds, depending on the temperature of said bath, said second deionized water bath containing no passivators, to produce a hydrate on the surface of said foil, drying said foil and forming said foil at effective formation voltages ranging from 10 volts to 190 volts in a bath comprising a dicarboxylic acid.

2. The method of claim 6 wherein the temperature of the second water bath is about 40° C.–60° C.

3. An aluminum foil for low voltage electrolytic capacitor use produced by the process of claim 1.

* * * * *